US012680656B2

(12) United States Patent
Torres Omaña et al.

(10) Patent No.: US 12,680,656 B2
(45) Date of Patent: Jul. 14, 2026

(54) INDEPENDENT SYSTEM FOR INSPECTION, MONITORING AND SURVEILLANCE OF LONG INFRASTRUCTURE AND THE ENVIRONMENT THEREOF

(71) Applicant: FUENTEBLANDOR HOLDINGS, S.L., León (ES)

(72) Inventors: Adrián Torres Omaña, León (ES); Cesáreo González Álvarez, León (ES)

(73) Assignee: FUENTEBLANDOR HOLDINGS, S.L., León (ES)

( * ) Notice: Subject to any disclaimer, the term of this patent is extended or adjusted under 35 U.S.C. 154(b) by 347 days.

(21) Appl. No.: 18/273,109

(22) PCT Filed: Jan. 14, 2022

(86) PCT No.: PCT/ES2022/070011
§ 371 (c)(1),
(2) Date: Jul. 19, 2023

(87) PCT Pub. No.: WO2022/157401
PCT Pub. Date: Jul. 28, 2022

(65) Prior Publication Data
US 2024/0302003 A1      Sep. 12, 2024

(30) Foreign Application Priority Data
Jan. 19, 2021      (ES) ............................ ES202130075U

(51) Int. Cl.
*F17D 5/00*            (2006.01)
*B61L 25/06*          (2006.01)
(Continued)

(52) U.S. Cl.
CPC ................ *F17D 5/00* (2013.01); *B61L 25/06* (2013.01); *B64U 2101/26* (2023.01); *B64U 2101/31* (2023.01); *H02G 1/02* (2013.01)

(58) Field of Classification Search
USPC .......................................................... 73/865.8
See application file for complete search history.

(56) References Cited

U.S. PATENT DOCUMENTS 11,319,065 B2 * 5/2022 Usman ................... B64U 10/10
2017/0292499 A1 * 10/2017 Sia ............................ F03D 9/25
(Continued)

FOREIGN PATENT DOCUMENTS

CA          2745815 A1      8/2011
CN          106451212 A      2/2017
(Continued)

OTHER PUBLICATIONS

Written Opinion and International Search Report, Application No. PCT/ES2022/070011, Mailed Mar. 1, 2022, 20 pages.

*Primary Examiner* — Walter L Lindsay, Jr.
*Assistant Examiner* — Warren K Fenwick
(74) *Attorney, Agent, or Firm* — Falcon Rappaport & Berkman LLP

(57)                    ABSTRACT
Disclosed is an independent system for the inspection, monitoring and surveillance of long infrastructure and the environment thereof, which is based on a movable device with systems for propulsion and control of the device, power and recharging systems and navigation and positioning systems, and which is able to inspect the infrastructure and communicate with a remote control, the system being formed by an autonomous mobile device (DM) including rolling elements (R), and a grooved auxiliary line (LA) consisting of a cable comprising a guiding groove (RA).

15 Claims, 8 Drawing Sheets

(51) Int. Cl.
     *H02G 1/02*       (2006.01)
     *B64U 101/26*     (2023.01)
     *B64U 101/31*     (2023.01)

(56)                    References Cited

U.S. PATENT DOCUMENTS

2018/0170414 A1*    6/2018   Arndt ................... B61L 25/023
2018/0297699 A1*   10/2018   Ortiz ................... G05D 1/0094

FOREIGN PATENT DOCUMENTS

| | | | |
|---|---|---|---|
| CN | 212195167 | U | 12/2020 |
| CN | 113904263 | A | 1/2022 |
| ES | 1271675 | U | 6/2021 |
| JP | H10248130 | A | 9/1998 |
| JP | 2016056682 | A  * | 4/2016 |
| KR | 101958266 | B1 | 3/2019 |
| WO | 2004070902 | A1 | 8/2004 |

* cited by examiner

LA

LA

R

INDEPENDENT SYSTEM FOR INSPECTION, MONITORING AND SURVEILLANCE OF LONG INFRASTRUCTURE AND THE ENVIRONMENT THEREOF

FIELD OF INDUSTRIAL APPLICATION

This invention relates to a system for the inspection of infrastructures based on the installation of an autonomous mobile device capable of being displaced in a self-propelled manner on an auxiliary line. The system allows the inspection, monitoring and surveillance of long linear infrastructures (railroad lines, oil pipelines, power lines, etc.) and the environment thereof.

PRIOR ART

Today, there are a number of very long infrastructures (railways, high and low voltage overhead lines, lighting and communication lines, gas pipelines, etc.) which, for operational safety reasons, must be inspected with visual means and other technologies to ensure their integrity and general good condition.

The deployment of devices along the infrastructure is, at present, a complex and expensive solution given the drawbacks for supplying, communicating and maintaining said devices to the scale that would be needed in order to provide coverage to said infrastructure.

It is for this reason that the possibility of providing more cost-effective but also equally efficient automated systems for said tasks, such as Unmanned Aerial Systems, has recently been the object of study.

In the field of overhead power lines, line inspection robots have been introduced. These robots are, in fact, an extension of the personnel displacement solution which allows ground personnel to deploy a robot on one or more conductors of the overhead line which, as it moves along the line, inspects the condition of the cables. As an inventive element, these robots are able to circumvent the insulator strings that interrupt the natural movement of the robot between one span of the line and another. Once the robot has inspected a section of line, it is retrieved by the ground personnel and returned to its base. Given the aforementioned limitations of design and use, such systems cannot be considered as assimilable to the object of the present invention. There is a wide variety of patents that describe functionalities similar to those of this invention, but some are based on flying drones such as those described in patent US2018170414 or in Korean patent KR101958266, others are dependent on the line to be inspected, or on objects moving on it, such as US2018170414 or U82018297699, or dependent on another flying object, such as Japanese patent JP2016056682. Furthermore, it is very common to find solutions that move on the line itself, capable of overcoming all kinds of obstacles, such as WO2004070902.

However, there are no solutions based on the layout of independent auxiliary lines with autonomous mobile devices which are displaced on same by means of guiding grooves, so as not to interfere with the normal operation of the line to be inspected, nor having to avoid objects that may collide with the device.

DESCRIPTION OF THE INVENTION

This infrastructure inspection system is based on the installation of a grooved auxiliary line from which there hangs an autonomous mobile device capable of being displaced in a self-propelled manner, i.e., it is a system independent of the infrastructure to be inspected. The equipment, drone or autonomous mobile device is coupled to a grooved auxiliary line that ensures its anchoring, the traction thereon and its release, if necessary, for example, for maintenance. The autonomous mobile device has a system for propulsion in order to cause the displacement thereof on the grooved auxiliary line and to then run along all or part of the infrastructure to be inspected.

The major advantages of the system are its greater operability in all weather conditions, greater safety against the risk of falling on the infrastructure and the environment thereof and the reduction of the qualification requirements for operators.

The grooved auxiliary line consists of a cable the section of which has some type of guiding groove, which allows the coupling of the autonomous mobile device such that it allows the longitudinal displacement thereof along the cable and the ability to stop at any point along the path.

The core of the auxiliary line can also replace some of the cables that are installed in overhead lines as protection, power, signaling or communications cables. In particular the so-called ground or guard cable, which is an aluminum-steel alloy cable (typically LA 110) which connects surge arresters, fittings, poles and grounding points to shunt surges (lightning, discharges, etc.) to ground.

Another option is that the auxiliary cable could act as an optical fiber cable for communications or signaling.

A third option consists of one of the cores of the auxiliary cable consisting of a series of conductors providing power (by contact or induction) to the drone continuously or semicontinuously (frequent intervals) or serving as a channel for transmitting information between the drone and the control center.

The fixing system for fixing the autonomous mobile device in the grooved auxiliary line allows the traction of autonomous mobile device on the cable, enabling displacement while at the same time its design prevents it from being able to be accidentally released, which provides complete security.

A key feature of the system is that the design of the grooved auxiliary line and of the autonomous mobile device cause said grooved auxiliary line to be able to be anchored to a mount without hindering the displacement of the autonomous mobile device. Thus, the autonomous mobile device can move freely along the grooved auxiliary line, without the clamping supports of said line requiring a particular actuation on the part of the autonomous mobile device upon passing through the supports.

An important aspect of the system is the existence of a charging station for the autonomous mobile device which allows its parking and controlled docking, the establishment of electrical contact for charging the autonomous mobile device and a subsystem for connection to and protection of the power grid. The charging stations can also provide radio communication link functionality for the autonomous equipment.

BRIEF DESCRIPTION OF THE DRAWINGS

FIGS. 4, 5 and 6 correspond with movable devices similar to that of FIG. 3, but for different applications.

DETAILED DISCLOSURE OF AN EMBODIMENT

Figures 1A, 1B:
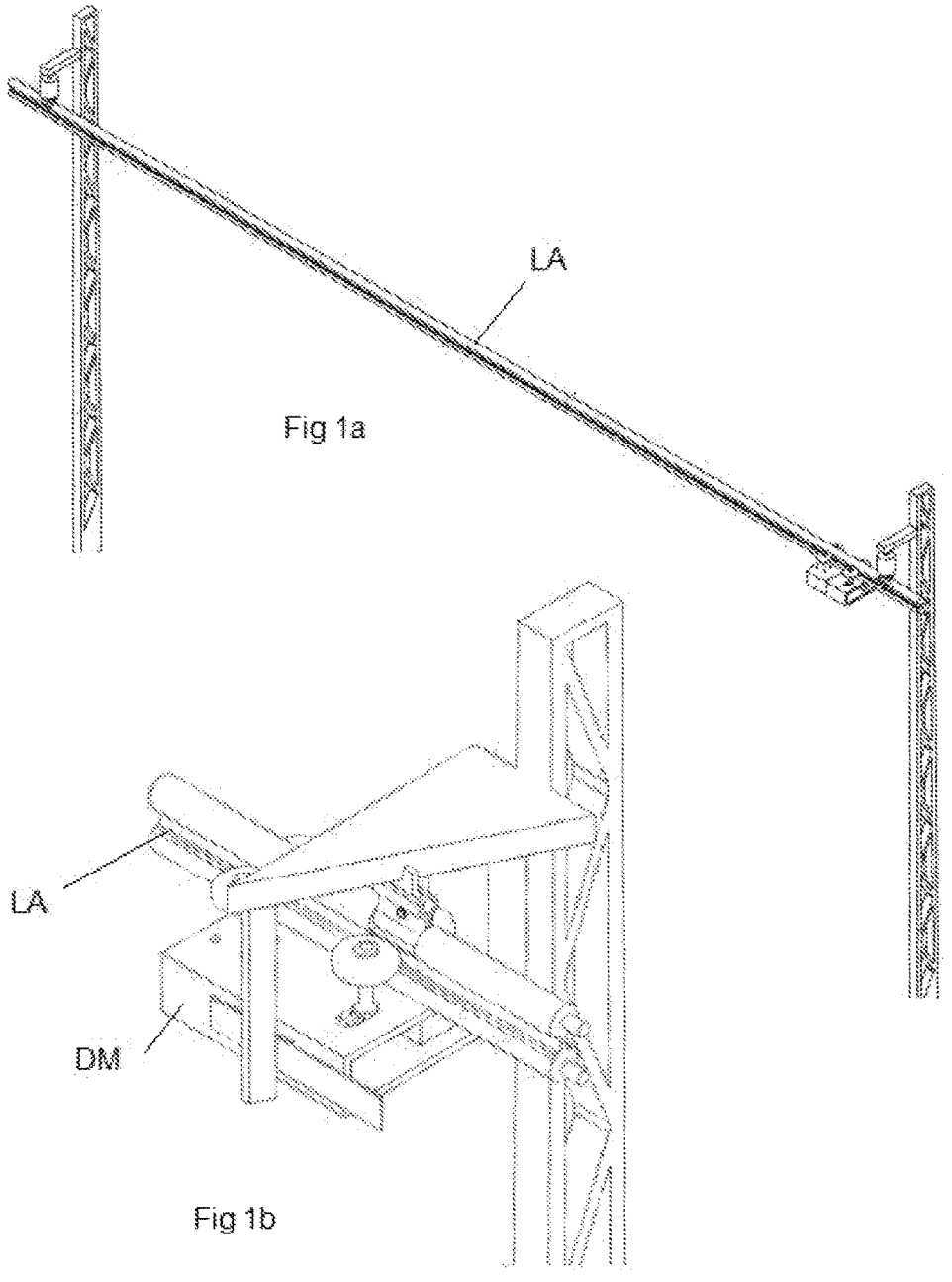
FIG. 1*a* depicts a possible layout of the independent anchoring system in a section repeating along its entire path.
FIG. 1*b* is the detail of a mooring pole for the layout, of how the grooved auxiliary line hangs from it and of the autonomous mobile device that is displaced supported on the grooved auxiliary line.
Figure 2A:
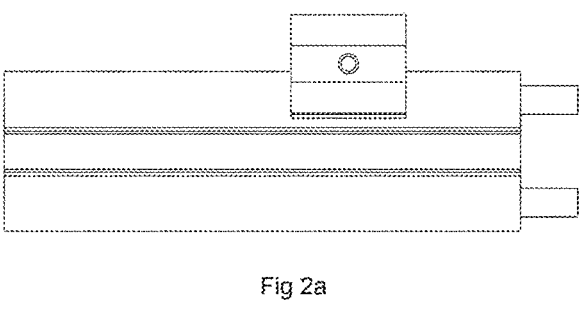
FIGS. 2*a*, 2*b*, 2*c* and 2*d* are perspective, front and top views of the grooved auxiliary line, together with a section of its physical structure.
Figure 2C:
Figure 2B:
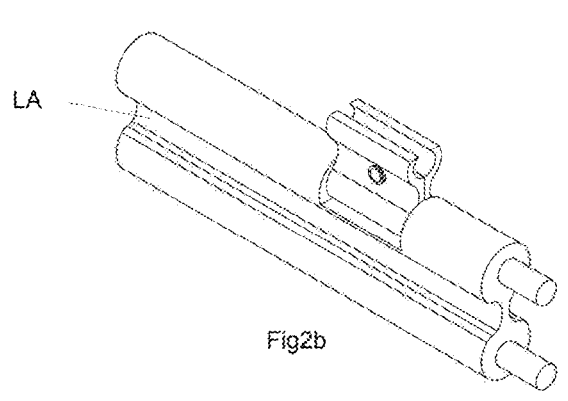
Figure 2D:
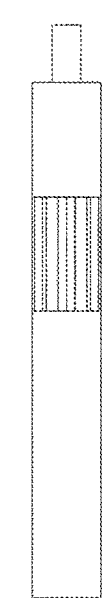
Figure 3A:
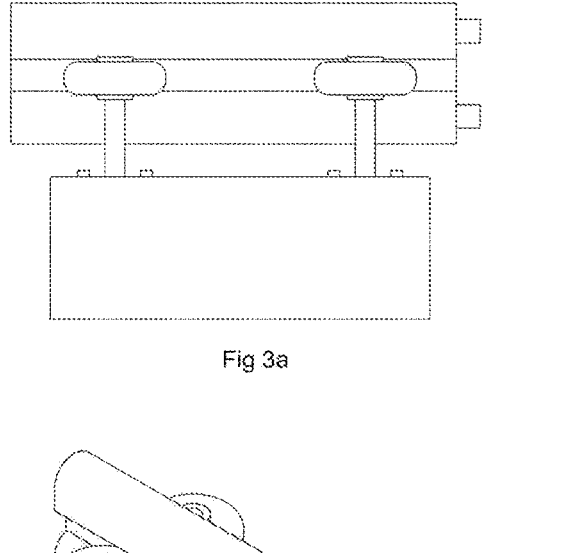
FIGS. 3*a*, 3*b*, 3*c* and 3*d* depict several perspective, front, side and top views of the autonomous mobile device.
Figure 3B:
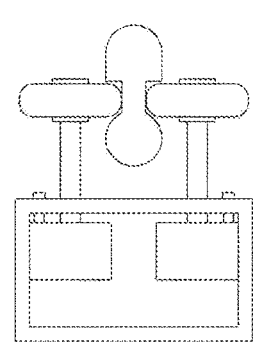
Figure 3C:
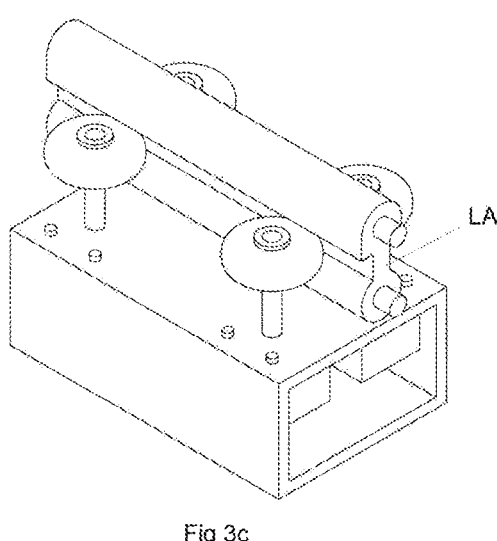
Figure 3D:
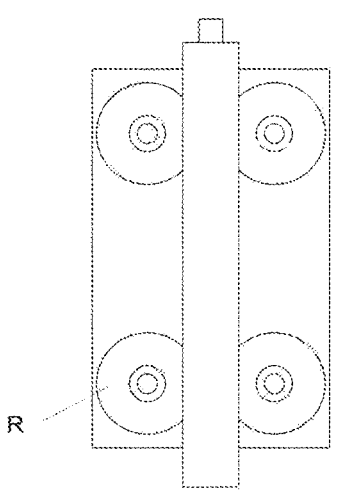

FIG. 1*a* shows an exemplary layout of this system, which repeats along the entire path. FIG. 1*b* shows in detail the assembly of components forming the system for inspection of infrastructures. It is based on the installation of an autonomous mobile device DM capable of being displaced in a self-propelled manner on a grooved auxiliary line LA for performing inspection, monitoring and surveillance tasks as a result of the sensing equipment it incorporates.

A key feature of the invention is that the design of the grooved auxiliary line LA and of the autonomous mobile device allow said grooved auxiliary line to be able to be anchored or suspended from a mount, such as columns, supports or facings, without hindering the displacement of the autonomous mobile device along the guiding groove. It is therefore independent of the layout to be inspected.

FIG. 2 shows the detail of the grooved auxiliary line LA. FIG. 3 shows the autonomous mobile device DM. This device incorporates a system for propulsion which is coupled to the grooved auxiliary line by a guiding groove RA for the displacement of the device, ensuring its anchoring, the traction thereon and its release, if necessary, for example, for maintenance.

The grooved aerial auxiliary line LA is fixed by means of an anchoring fitting, for example a clamp, allowing the rolling elements R to transmit the movement of the autonomous mobile device DM using the inner surface of the guiding groove RA, as seen in FIG. 3. The autonomous mobile device is thereby able to move freely along the grooved auxiliary line, without the clamping supports of said line requiring a particular actuation on the part of the autonomous mobile device so as to allow it to pass through same.

The grooved auxiliary line LA consists of a cable having a grooved section which allows the coupling of the autonomous mobile device such that it can be displaced longitudinally along the cable. Since it is a cable, it can be suspended from two points, forming a very long span, without intermediate supports.

FIG. 3 explains the fixing system, where it can be seen that the autonomous mobile device moves on the grooved auxiliary line, enabling the displacement, as well as preventing it from being able to be accidentally released.

In order to propel the autonomous mobile device through the grooved auxiliary line, the traction system has a series of rolling elements R, which are displaced by the vertical guiding surface, as seen in FIG. 3, rotating about the vertical shaft thereof, operated by a motor incorporated in the frame of the autonomous mobile device.

Figures 4A, 4B, 4C, 4D:
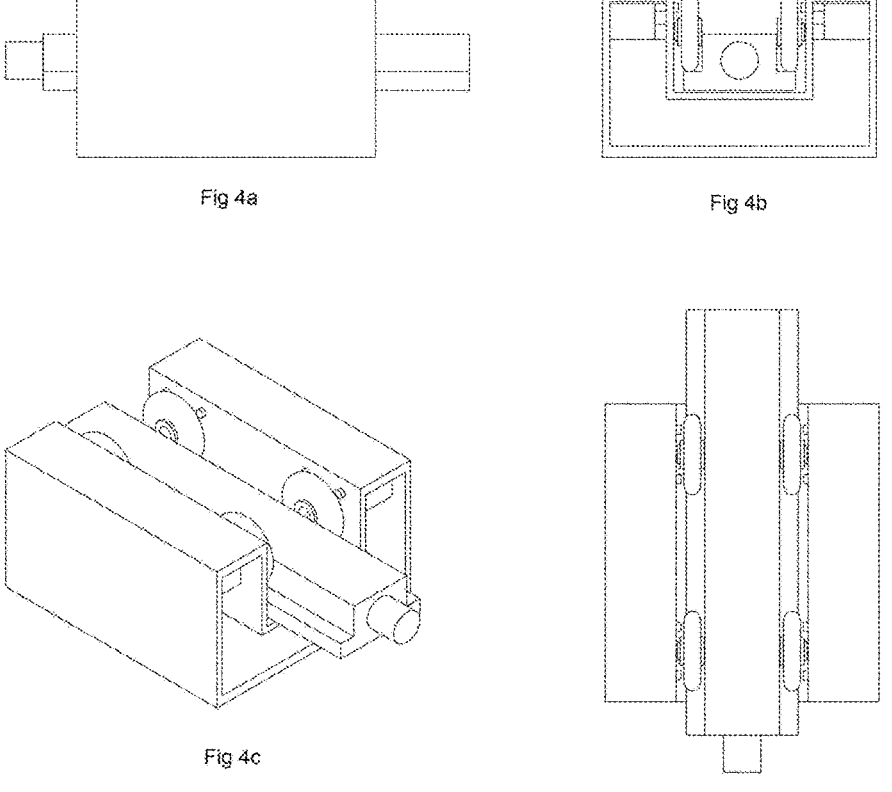
FIGS. 4*a*, 4*b*, 4*c* and 4*d* depict different views of a variant of the device where the guiding surface is horizontal, with the rolling elements rotating about the horizontal shaft thereof.
Figure 5A:
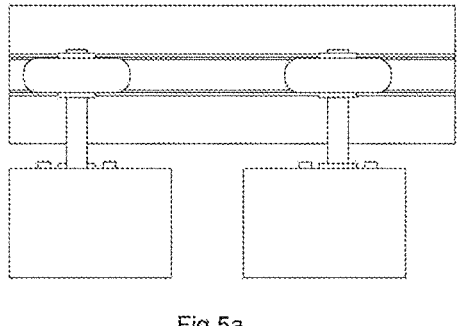
FIGS. 5*a*, 5*b*, 5*c* and 5*d* depict different views of a variant of the device, where the rolling elements are arranged in pairs, such that the displacement can accommodate the curvature of the auxiliary line.
Figure 5B:
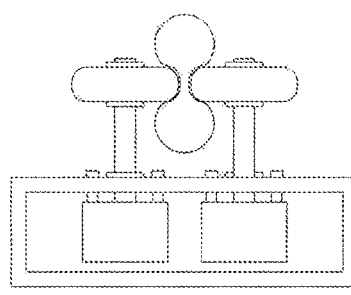
Figure 5C:
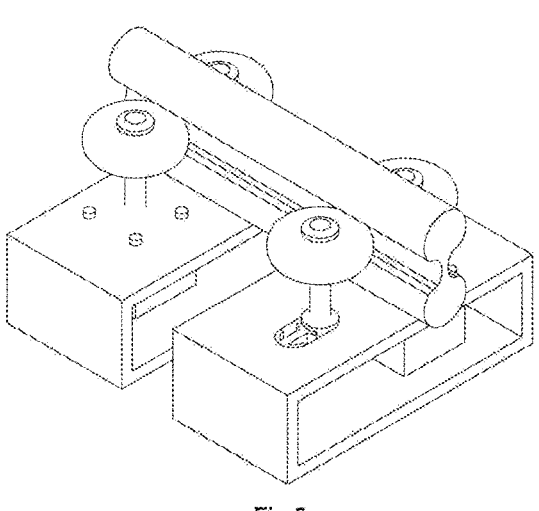
Figure 5D:
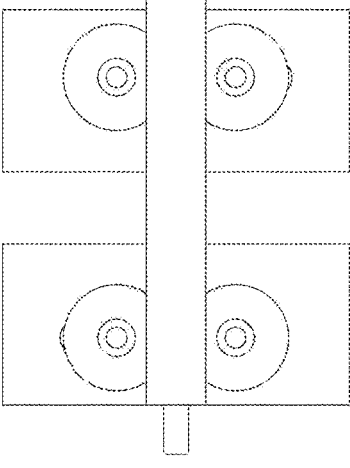
Figure 6A:
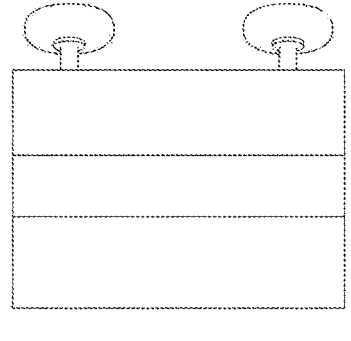
FIGS. 6*a*, 6*b*, 6*c* and 6*d* show views of a variant such that the device can accommodate different angles of orientation of the rolling elements and therefore different guiding surfaces.
Figure 6A:
Figure 6B:
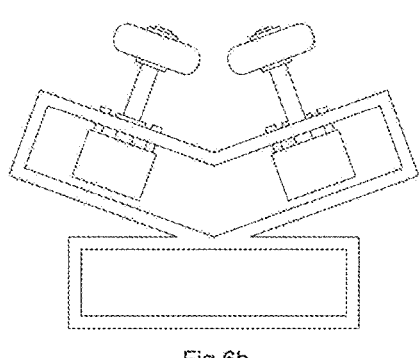
Figure 6C:
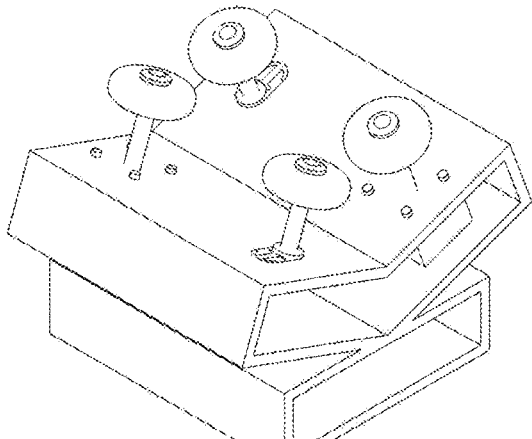
Figure 6D:
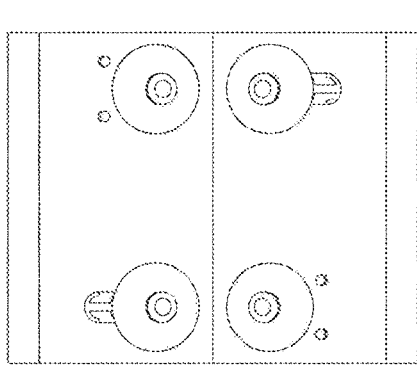

It is also possible for the guiding surface to be horizontal, with the rolling elements rotating about the horizontal shaft thereof, as seen in FIG. 4.

As can be seen in FIG. 5, other possible variants consist of the rolling elements being arranged in pairs on a mount transverse to the grooved auxiliary line, such that they rotate freely on the frame of the autonomous mobile device and their displacement can accommodate the curvature of the auxiliary line. Likewise, as shown in FIG. 6, the angle of orientation of the rolling elements can be selected for the purpose of accommodating different choices of guiding surface of the grooved auxiliary line.

Figure 7:
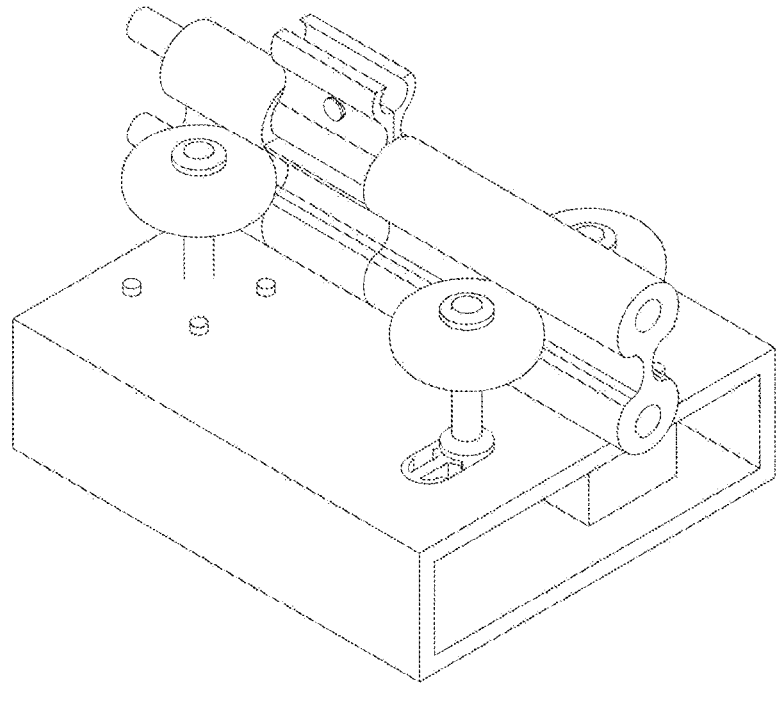
FIG. 7 depicts a motor-shaft-rolling element assembly of the autonomous mobile device connected to the grooved auxiliary line.
Figures 8, 9, 10, 11, 12, 13, 14, 15, 16:
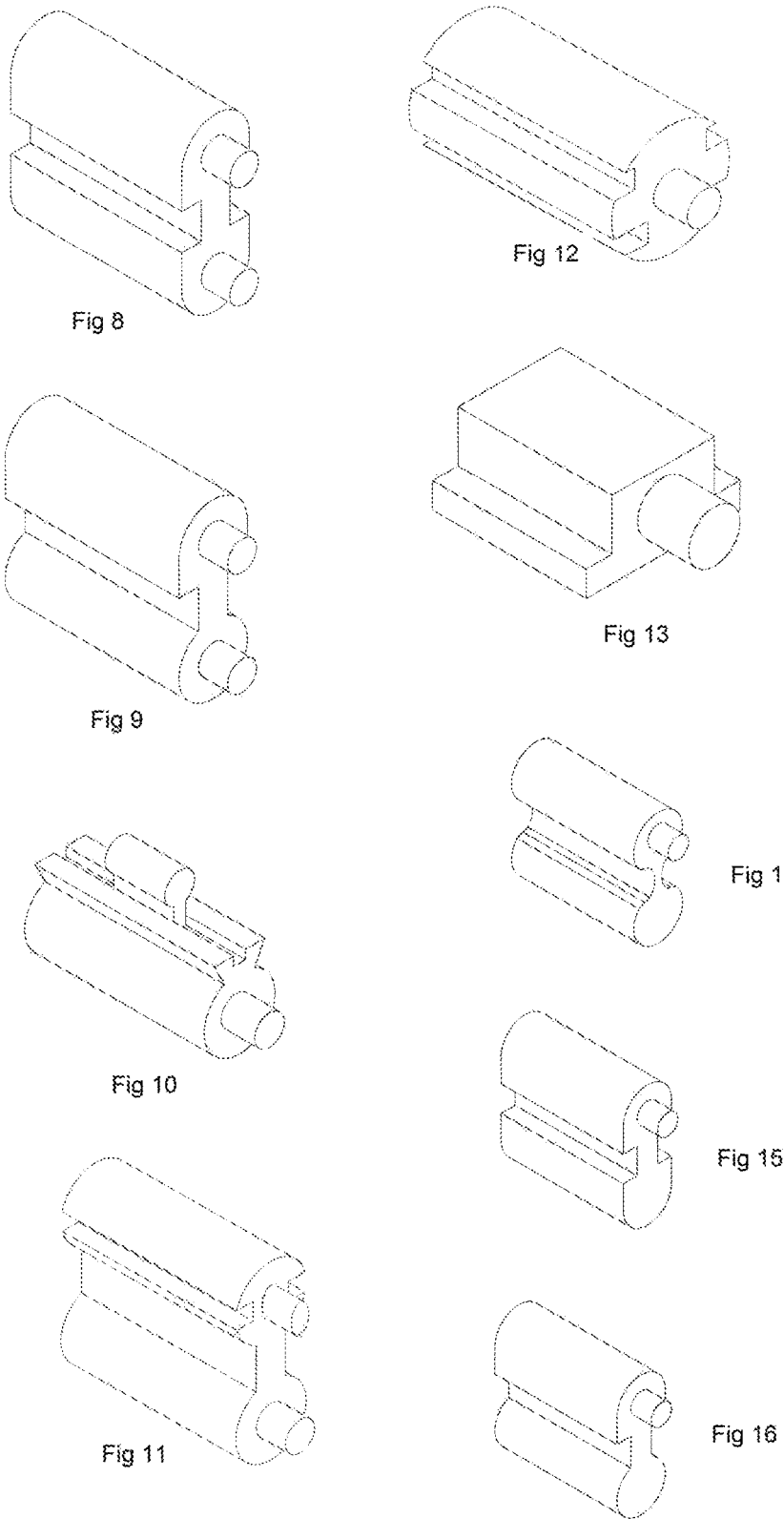
FIGS. 8 to 16 show different configurations of the grooved auxiliary line, as appropriate for each application.

To enable the release of the autonomous mobile device and its removal from the grooved auxiliary line of the motor-shaft-rolling element assembly, it can be laterally displaced, as shown in FIG. 7.

To allow the displacement of the autonomous mobile device along the grooved auxiliary line, the latter may adopt widely varying configurations and geometric shapes, as shown in FIGS. 8 to 16.

The cable of the grooved auxiliary line LA may be manufactured from different materials based on the configuration of the autonomous mobile device and its weight and on the characteristics of the line on which it is installed, such as the length of spans, the characteristics of the supports, the applicable legal requirements, etc.

The system has an electronic system for control of the autonomous mobile device which controls all the subsystems and receives instructions from the remote control, in addition to a power system, including a battery powering the drone and a recharging system and a charge sensor.

Another aspect of the invention relates to a system for control and remote supervision of the autonomous mobile device which allows providing it with instructions for parking, displacement, charging, navigation, collection of information, actuation of auxiliary devices, as well as for receiving and viewing the information generated by onboard systems.

The autonomous mobile device DM incorporates a subsystem for navigation and locating of the autonomous mobile device based on a GPS system, a revolution counter for each rolling element in contact with the cable as a complement to navigation and for internal diagnostics, a gyroscope and accelerometer as a complement to navigation and for internal diagnostics and for the auxiliary line, a communications module for both the remote control of the drone and for the sending of information.

The autonomous mobile device DM likewise incorporates a subsystem for monitoring and inspection of the infrastructure with the ability to incorporate, as required, the following: cameras, thermal cameras, laser measurement devices, ultrasound sensors, gas sensors, a subsystem with the ability to incorporate auxiliary devices such as megaphones, flame throwers or sprays, and a mount to incorporate other additional subsystems.

The invention claimed is:

1. An independent system for inspection, monitoring and surveillance of long infrastructures and an environment thereof, which is based on a movable device with systems for propulsion and control of the device, power and recharging systems and navigation and positioning systems, and which is able to inspect the infrastructure and communicate with a remote control, the system comprising:

an autonomous mobile device including rolling elements; and a grooved auxiliary line, which consists of a non-rigid cable comprising a guiding groove (RA) which allows displacement of the autonomous mobile device without anchoring of the cable to a mount structure hindering said displacement.

2. The independent system for the inspection, monitoring and surveillance of long infrastructures and the environment thereof according to claim 1, wherein a design of the grooved auxiliary line and of the autonomous mobile device allows said grooved auxiliary line to be anchored by means of an anchoring fitting, or to be suspended from a mount, without hindering the displacement of the autonomous mobile device along the guiding groove.

3. The independent system for the inspection, monitoring and surveillance of long infrastructures and the environment thereof according to claim 2, wherein a surface along which the autonomous mobile device moves can be vertical, with the rolling elements rotating about a vertical shaft thereof, or said surface can be horizontal, with the rolling elements rotating about a horizontal shaft thereof.

4. The independent system for the inspection, monitoring and surveillance of long infrastructures and the environment thereof according to claim 3, wherein the rolling elements can be arranged in pairs on a mount transverse to the grooved auxiliary line, which rotates freely on a frame of the autonomous mobile device, wherein the displacement thereof can accommodate a curvature of the auxiliary line.

5. The independent system for the inspection, monitoring and surveillance of long infrastructures and the environment thereof according to claim 3, wherein an angle of orientation of the rolling elements is adjusted in each case according to different surfaces along which the autonomous mobile device moves.

6. The independent system for the inspection, monitoring and surveillance of long infrastructures and the environment thereof according to claim 2, wherein the rolling elements can be arranged in pairs on a mount transverse to the grooved auxiliary line, which rotates freely on a frame of the autonomous mobile device, wherein the displacement thereof can accommodate a curvature of the auxiliary line.

7. The independent system for the inspection, monitoring and surveillance of long infrastructures and the environment thereof according to claim 2, wherein an angle of orientation of the rolling elements is adjusted in each case according to different surfaces along which the autonomous mobile device moves.

8. The independent system for the inspection, monitoring and surveillance of long infrastructures and the environment thereof according to claim 1, wherein the rolling elements of the autonomous mobile device can slightly rock, transmitting their movement using an inner surface of the guiding groove and thus accommodate a sag and variations in height and in direction of the grooved line.

9. The independent system for the inspection, monitoring and surveillance of long infrastructures and the environment thereof according to claim 8, wherein the rolling elements can be arranged in pairs on a mount transverse to the grooved auxiliary line, which rotates freely on a frame of the autonomous mobile device, wherein the displacement thereof can accommodate a curvature of the auxiliary line.

10. The independent system for the inspection, monitoring and surveillance of long infrastructures and the environment thereof according to claim 8, wherein an angle of orientation of the rolling elements is adjusted in each case according to different surfaces along which the autonomous mobile device moves.

11. The independent system for the inspection, monitoring and surveillance of long infrastructures and the environment thereof according to claim 1, wherein the rolling elements can be arranged in pairs on a mount transverse to the grooved auxiliary line, which rotates freely on a frame of the autonomous mobile device, wherein the displacement thereof can accommodate curvature of the auxiliary line.

12. The independent system for the inspection, monitoring and surveillance of long infrastructures and the environment thereof according to claim 11, wherein an angle of orientation of the rolling elements is adjusted in each case according to different surfaces along which the autonomous mobile device moves.

13. The independent system for the inspection, monitoring and surveillance of long infrastructures and the environment thereof according to claim 1, wherein an angle of orientation of the rolling elements is adjusted in each case according to different surfaces along which the autonomous mobile device moves.

14. The independent system for the inspection, monitoring and surveillance of long infrastructures and the environment thereof according to claim 1, wherein a core of the auxiliary line is formed by one or more conductors or optical fiber based on functional and mechanical characteristics of the line.

15. The independent system for the inspection, monitoring and surveillance of long infrastructures and the environment thereof according to claim 1, wherein a core of the auxiliary line consists of a metallic conductor, of required materials and size based on electrical and mechanical characteristics of the line, which may be connected to poles, fittings, surge arresters, and the remaining protective devices of the line.

* * * * *